Figure 1:
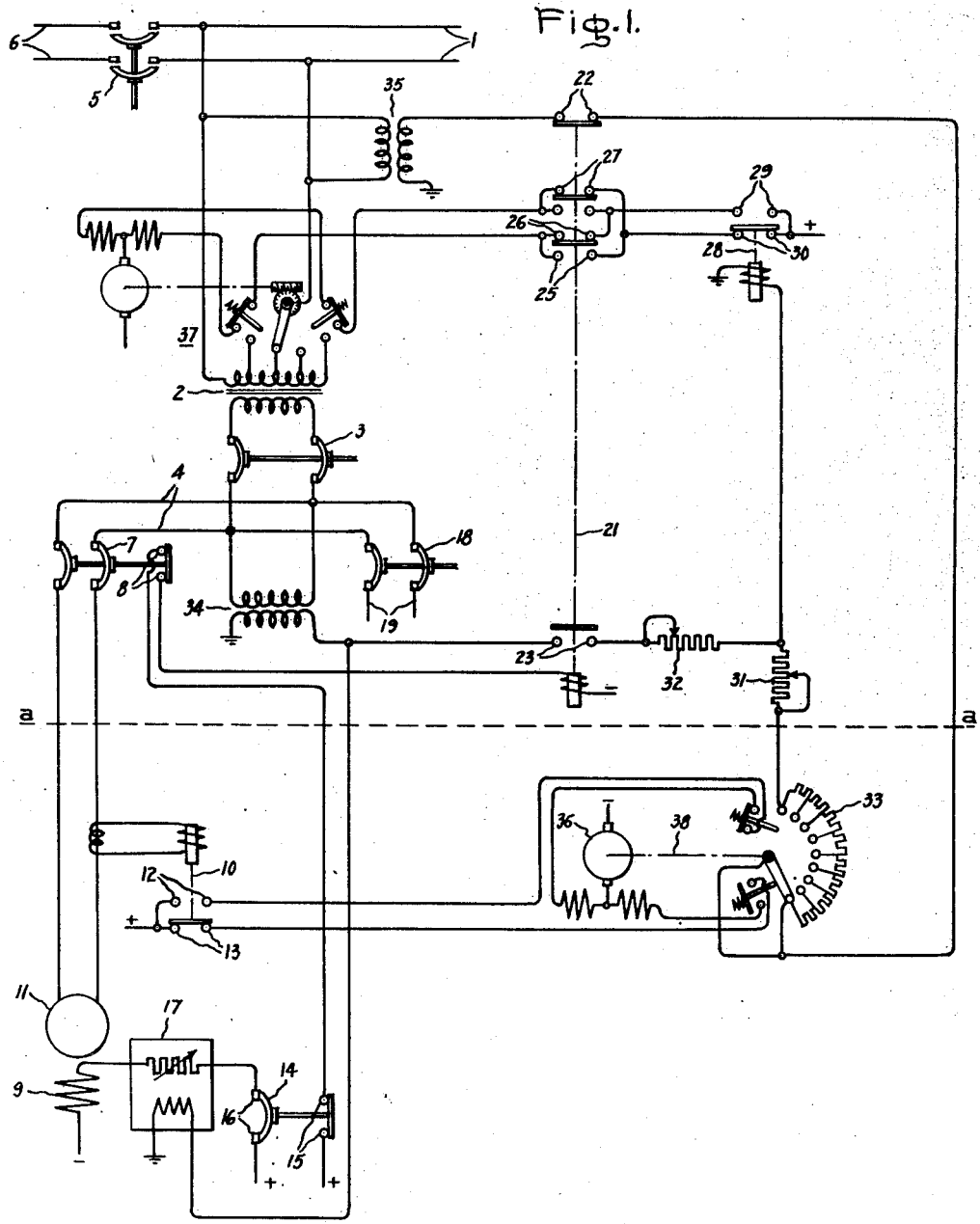

Dec. 27, 1949     H. BANY     2,492,729
DUAL VOLTAGE REGULATING ARRANGEMENT
Filed Sept. 2, 1948     3 Sheets-Sheet 2

Inventor:
Herman Bany,
by Ernest C. Britton
His Attorney.

Dec. 27, 1949    H. BANY    2,492,729
DUAL VOLTAGE REGULATING ARRANGEMENT
Filed Sept. 2, 1948    3 Sheets-Sheet 3

Inventor:
Herman Bany,
by Ernest C. Britton
His Attorney.

Patented Dec. 27, 1949

2,492,729

UNITED STATES PATENT OFFICE 2,492,729

DUAL VOLTAGE REGULATING ARRANGEMENT

Herman Bany, Lansdowne, Pa., assignor to General Electric Company, a corporation of New York Application September 2, 1948, Serial No. 47,383

12 Claims. (Cl. 323—106)

My invention relates to voltage regulating arrangements, and the principal object is to provide an improved dual voltage regulating arrangement suitable for use in an alternating current power system for regulating the voltages of both a particular load circuit and a power supply circuit therefor that also supplies other loads.

In accordance with my invention, the two circuits to be regulated are connected together through a variable voltage ratio power transfer device such as a regulating transformer, and one of the circuits, which can be designated as the incoming bus, is connected directly to the main power supply line and the other, which can be designated as the load bus, supplies a variable load and is also connected to a local source of volt amperes, such for example as a synchronous condenser.

In such a bus voltage ratio regulating arrangement, it is desirable that the voltages of both the load bus and the incoming bus be held at predetermined values during normal operation. Hence, another object of my invention is to automatically control the variable ratio voltage regulating transformer so as to maintain at a predetermined value the voltage of the incoming bus while at the same time automatically varying the output of the local source of volt amperes so as to maintain at a predetermined value the voltage of the load bus.

However, under abnormal load conditions when the synchronous condenser or other local source of volt amperes tends to become overloaded, its output necessarily must be limited to its full-rated value in order to prevent eventual overheating and resultant damage. Thus, under such abnormal conditions, it becomes impossible to maintain the voltages of both buses at their desired predetermined values. Hence, a selection must be made. Usually it is most important to hold the voltage of the load bus at the desired predetermined value in order to obtain the proper operation of the load utilization apparatus even at some sacrifice in overall system or adjacent generating or substation operating conditions.

Thus, another object of my invention is to provide an automatic selective voltage regulating arrangement for regulating a selected one of the interconnected buses under excessive load conditions so as to cause the volt amperes, which are required for maintaining the load bus voltage at the desired value, to be supplied from the power system by automatically changing the voltage ratio of transformation of the regulating transformer, and consequently the incoming bus voltage the necessary amount.

It is a further object of my invention, if for any reason the synchronous condenser or other source of volt amperes connected to the load bus is not available or is shut down, to provide an automatic selective regulating arrangement such that the voltage of the load bus instead of that of the incoming bus is automatically regulated by the voltage regulating transformer at the expense of the incoming bus voltage, which then must operate unregulated.

Thus, the general object of my invention is under normal operating conditions to regulate the voltages of the load and the supply circuits separately, but under various abnormal conditions to give the more important load circuit preference in the regulation of the corresponding voltages.

Figure 2:
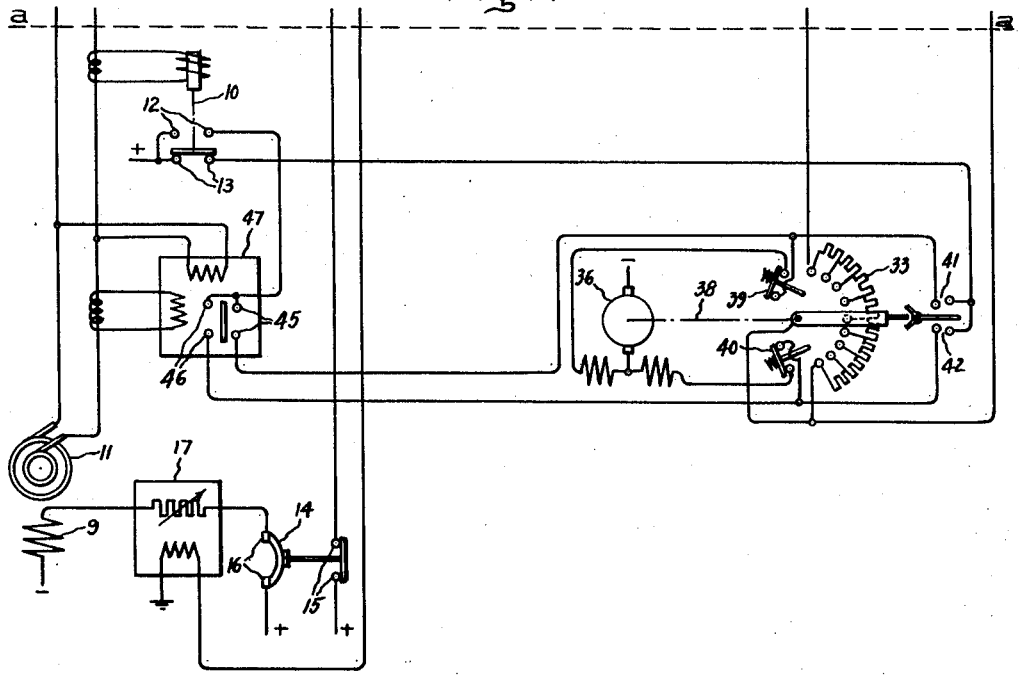
Figure 3:
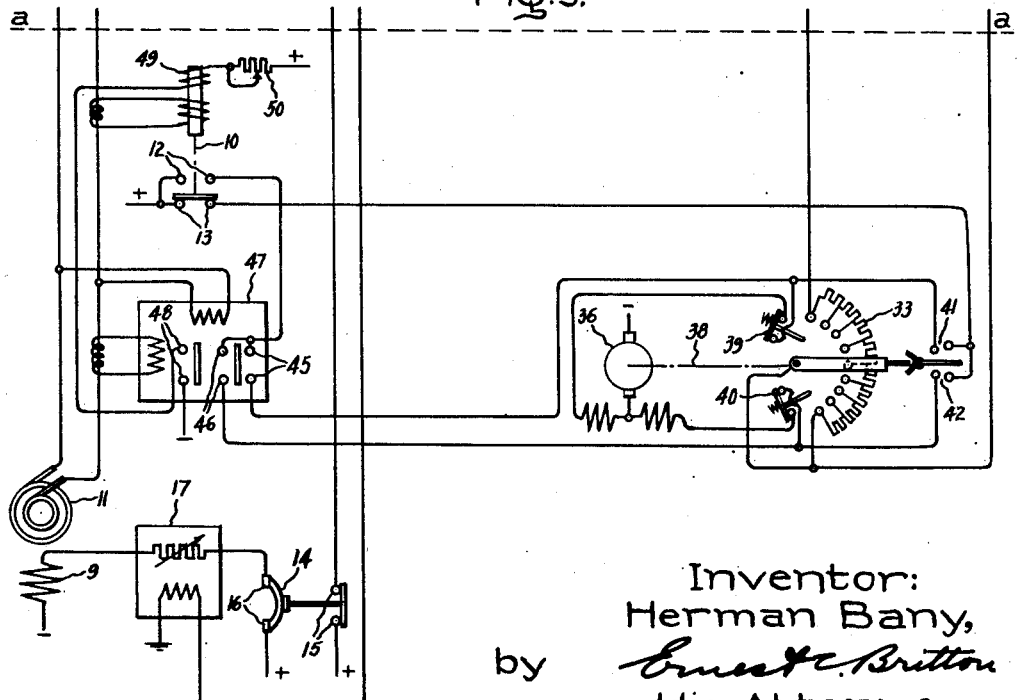
Figure 4:
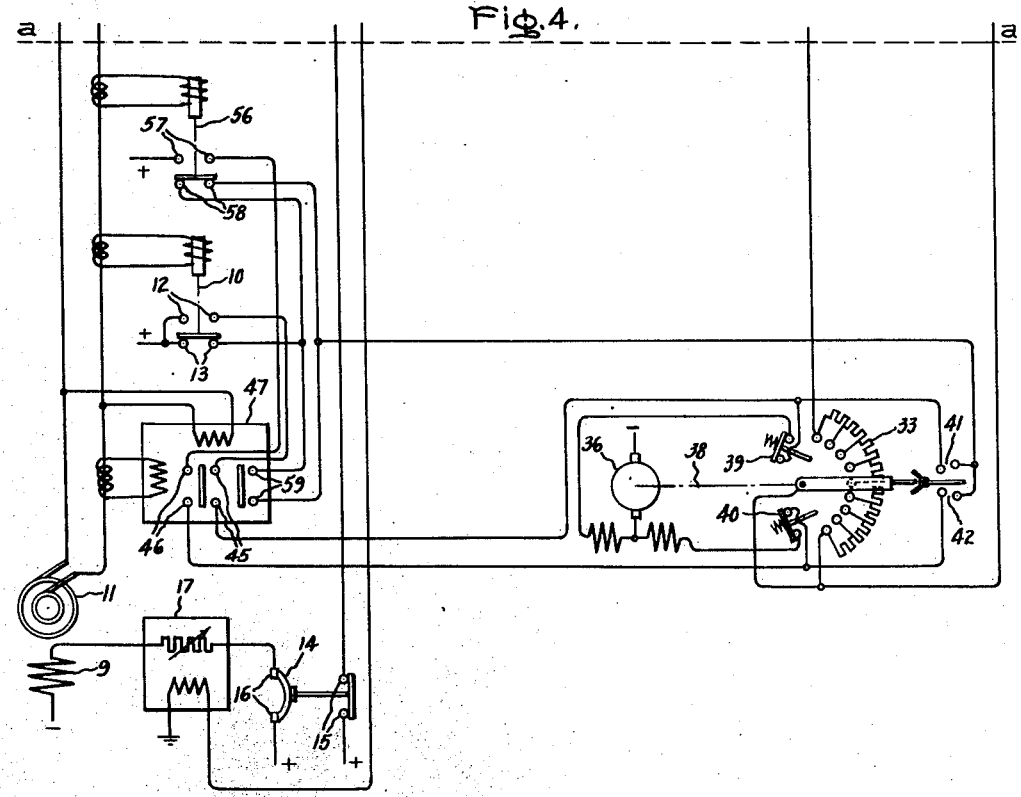
Figure 5:
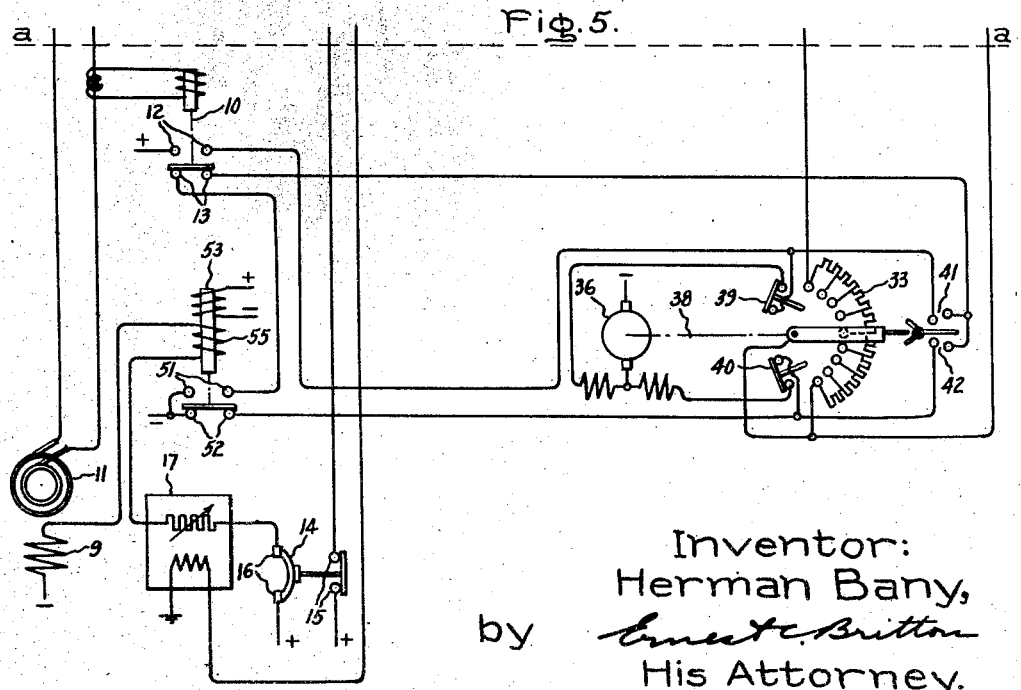

My invention will be better understood from the following description of the accompanying drawings in which Fig. 1 diagrammatically illustrates one embodiment of the invention in an automatic regulating arrangement for a load circuit and an alternating current supply circuit therefor; Fig. 2 illustrates a modified form of automatic regulating apparatus that may be substituted for that shown below the line a—a in Fig. 1 if desired; and Figs. 3, 4 and 5 show further modifications similar to Fig. 2.

Referring to Fig. 1, 1 represents an A.-C. incoming bus connected to an A.-C. power system 6 through a suitable circuit breaker 5. A.-C. bus 1 supplies electrical energy to a load bus 4 through a suitable circuit breaker 3 and a suitable tap changing transformer 2. As shown, the transformer 2 is provided with a motor operated tap changer 37 for varying the number of active primary turns so as to change the voltage ratio of the transformer. The load bus 4 supplies load 19 through a suitable circuit breaker 18. There is also normally in operation and connected to the load bus 4 through circuit breaker 7, a local source 11 of volt amperes, such as a synchronous condenser. The volt ampere source 11 is provided with a voltage regulator 17 of any suitable type for automatically maintaining the terminal voltage of source 11 and of load bus 4 at a predetermined value when source 11 is in operation.

Volt ampere source 11 is shown as a synchronous condenser provided with field winding 9. It may be started and placed into operation by any means well known in the art. For purposes of this invention, it will be necessary when the starting sequence has been completed for circuit breaker 7 to be closed connecting the armature of source 11 to load bus 4 and for field breaker 14 to be closed connecting the field winding 9 to its source of excitation through contacts 16 of field circuit breaker 14 and through the variable resistance element of regulator 17. Thus, when source 11 is in operation, contacts 15 of field circuit breaker 14 and contacts 8 of circuit breaker 7 are closed energizing the circuit of auxiliary relay 21, thus causing contacts 23, 25 and 27 of this device to be opened and contacts 22, 24 and 26 to be closed.

The operating coil of voltage regulator 17 is connected to the secondary winding of potential transformer 34 which has its primary winding connected to load bus 4 in accordance with practice well known in the art. Hence, regulator 17 by controlling the field current of source 11 through its variable resistance element maintains the voltage of load bus 4 at a predetermined value when source 11 is in operation.

In order to maintain the voltage of the incoming bus 1 at a predetermined value for different amounts of load 19 when source 11 is in operation and is not overloaded, I provide a voltage regulating relay 28 which has its operating coil connected to the secondary winding of potential transformer 35, which has its primary winding connected to incoming bus 1, through contacts 22 of auxiliary relay 21, motor operated rheostat 33 and manually adjustable resistor 31. Contacts 30 of relay 28 are closed when the voltage supplied to its coil circuit from incoming bus 1 is below a predetermined value, contacts 29 of relay 28 are closed when this voltage is above a predetermined value and neither the contacts 29 or 30 are closed when the voltage is at this predetermined value. The contacts 29, when closed, complete a circuit through contacts 26 of auxiliary relay 21 for reversible motor 20 of the tap changer 37 to decrease the voltage of the winding of transformer 2 connected to the bus 1, and the contacts 30, when closed, complete a circuit through contacts 24 of auxiliary relay 21 for motor 20 of the tap changer 37 to increase the voltage of the winding of transformer 2 connected to the incoming bus 1. Hence, voltage regulating relay 28 maintains the voltage of incoming bus 1 through transformer 2 at a predetermined value by controlling the position of tap changer 37 by means of reversible motor 20. In order to limit the output of volt ampere source 11 to its full rated capacity when load 19 increases beyond a certain point, an overcurrent relay 10 is connected in any suitable manner in the output circuit of source 11 and is provided with contacts 12 and 13. Contacts 12 of relay 10 are closed when the output of source 11 is above its full rated capacity, contacts 13 of relay 10 are closed when the output of source 11 is below its full rated capacity and neither the contacts 12 or 13 are closed when the source 11 is delivering approximately its full rated capacity.

In order for relay 10 to prevent the overloading of source 11, its contacts control the position of motor operated rheostat 33 which is connected in series with the coil of voltage regulating relay 28 when source 11 is in operation. When source 11 is operating below full rated capacity, contacts 13 of relay 10 close and operate reversible motor 36 of the rheostat mechanism 38 in the direction to increase the resistance of rheostat 33 and thus normally when source 11 is operating below full rated capacity rheostat 33 is in the maximum resistance position as shown in Fig. 1. When the output of source 11 increases above its full rated capacity, contacts 12 of relay 10 close and operate reversible motor 36 of rheostat mechanism 38 in the direction to decrease the resistance of rheostat 33. This has the effect of decreasing the voltage setting of regulating relay 28 which thereupon closes its contacts 29. These contacts, as previously described, complete a circuit for reversible motor 20 of the tap changer 37 to decrease the voltage of the winding of transformer 2 connected to the incoming bus 1 and thereby increase the voltage of the transformer winding connected to load bus 4. By thus increasing the voltage of load bus 4 with respect to incoming bus 1, additional reactive volt amperes are supplied from incoming bus 1 through transformer 2 to load bus 4 and to the predominantly reactive load 19. This relieves source 11 of some of the reactive volt ampere output it has been supplying to load 19 and so when its output has been reduced so that it again delivers approximately full rated output to load bus 4, the contacts 12 of relay 10 re-open. This interrupts the circuit to motor 36 and rheostat 33 remains in position to provide the proper setting of voltage regulating relay 28 to give the correct value of voltage on incoming bus 1 which will prevent overloading of source 11, but will still allow it to deliver full rated output to load bus 4. When load 19 decreases slightly so that the output of source 11 again decreases below full rated value, the contacts 13 of relay 10, by controlling motor 36, will re-position rheostat 33 to another value to give the proper setting of relay 28 so that source 11 will continue to operate at approximately full rated load. If a further load reduction occurs, the contacts 13 of relay 10 will again close, and if this reduction is sufficient, they will remain closed, causing rheostat 33 to run to the maximum resistance position thus permitting relay 28 through tap changer 37 and transformer 2 to maintain a predetermined value of voltage on incoming bus 1.

Varying the ratio of the transformer so as to increase the load bus voltage from the system decreases the field excitation of the synchronous condenser because it will hold the load bus voltage constant, and it therefore supplies less reactive (overexcited) vars to the load, and the system must make up the deficiency.

Likewise, varying the ratio of the transformer so as to decrease the load bus voltage from the system increases the field excitation of the synchronous condenser because it will hold the load bus voltage constant, and it therefore supplies less capacitive (underexcited) vars to the load, and the system must make up the deficiency.

If for any reason the source 11 of volt amperes is not available or is shut down, as may be the case when load 19 is sufficiently low, so that circuit breaker 7 and field circuit breaker 14 are open, then the coil circuit of auxiliary relay 21 is opened by the contacts 15 of field circuit breaker 14 and by contacts 8 of circuit breaker 7. This opens the contacts 22, 24 and 26 of auxiliary relay 21 and closes the contacts 23, 25 and 27. The coil circuit of voltage regulating relay 28 is thus transferred from the secondary winding of potential transformer 35, which has its primary winding connected to incoming bus 1, to the secondary winding of the potential transformer 34, which has its primary winding connected to load bus 4, by means of contacts 22 and 23, respectively, of auxiliary relay 21. When this transfer has been made, motor operated rheostat 33 and manually operated adjusting resistance 31, associated with the secondary winding of potential transformer 35, are also removed from the coil circuit of relay 28 and manually operated adjusting resistor 32, associated with the secondary winding of potential transformer 34, is inserted in their place. Manually operated adjusting resistors 31 and 32 are provided for the purpose of making different settings for voltage regulating relay 28 depending upon whether it is regulating the voltage of incoming bus 1 or load bus 4.

Regulating relay 28 is now responsive to the voltage of load bus 4 instead of to the voltage of incoming bus 1. The circuits from the contacts 29 and 30 of relay 28 to motor 20 of tap changer 37 have now been reversed by the change in position of auxiliary relay 21 so that now on overvoltage on load bus 4 the contacts 29 of relay 28 operate the reversible motor 20 of tap changer 37 through the contacts 27 of auxiliary relay 21 in such a direction as to lower the voltage of the winding of transformer 2 connected to load bus 4. On undervoltage on load bus 4, contacts 30 of relay 28 operate the motor of tap changer 37 through the contacts 26 of auxiliary relay 21 in the direction to raise the voltage of the winding of transformer 2 connected to load bus 4. Hence, regulating relay 28 now maintains the voltage of load bus 4 at a predetermined value through tap changer 37 of transformer 2 when source 11 is not in operation.

The arrangement described above includes provisions for readjusting the setting of voltage regulating relay 28 only when source 11 is overloaded due to supplying reactive volt amperes to the load or system in excess of its rating. No provision is shown for readjusting the setting of relay 28 if source 11 should have reached the limit of its capacity in supplying capacitive volt amperes. If volt ampere source 11 is of the type and is so applied in service that it can be overloaded by delivering capacitive volt amperes in excess of full rated capacity, then relay means will have to be provided to detect this condition. These must prevent the operation of motor operated rheostat 33 to decrease its resistance under these conditions since its operation in this manner would merely tend to make the source 11 deliver additional capacitive volt amperes instead of relieving it of some and this incorrect action will further be cumulative, resulting in unstable operation.

Hence, for loads that are predominantly capacitive and if the power source 11 is such that it can be overloaded under these conditions, the construction and control of the motor operated rheostat 33 will have to be so modified that the setting of voltage relay 28 is raised at this time when source 11 is overloaded. The necessary modifications to accomplish this as well as to obtain proper operation for predominantly reactive loads, as already described, are shown in Fig. 2.

In order to detect whether source 11 is supplying reactive or capacitive volt amperes to the load or system, I provide var relay 47 which is connected to the circuit of source 11 in any suitable manner so that contacts 45 are closed while the source 11 is overexcited and supplying reactive volt amperes, and the contacts 46 of relay 47 are closed while the source 11 is underexcited and is supplying capacitive volt amperes.

The functions of var relay 47 for the purpose of this invention can also be performed by a relay, in the field circuit 9 of the condenser 11, which is responsive to the amount of condenser field current. At field currents above a predetermined value, the condenser will be delivering reactive volt amperes; at field currents of a predetermined value, the power factor of the condenser 11 will be substantially unity; and at field currents below a predetermined value, condenser 11 will be delivering capacitive volt amperes. Such a field current responsive relay can have its contacts connected to function in exactly the same manner as the contacts of the var relay 47 in Figs. 2, 3 and 4 and fulfill exactly the same functions.

In order to be able to raise the setting of voltage regulating relay 28 when source 11 is supplying capacitive volt amperes in excess of its rating and also to be able to lower its setting when supplying predominately reactive volt amperes in excess of its rating, as has been described previously in connection with Fig. 1, I modify motor operated rheostat 33 by providing additional resistance steps and arranging the construction and control of this rheostat so that normally it is positioned in the approximate mid-point of its travel, instead of in the maximum resistance position as was previously described in connection with Fig. 1.

Two mid-position switches 41 and 42 are provided and so arranged that switch 42 is closed only when the arm of rheostat 33 is in the decreased resistance position and switch 41 is closed only when the arm of rheostat 33 is in the increased resistance position. Switches 39 and 40 are conventional limit switches open only at the all-out and all-in positions, respectively, of rheostat 33.

In order to maintain the voltage of the incoming bus 1 at a predetermined value for different amounts of load 19 when source 11 is in operation and is not overloaded, the operation of the equipment is just the same as has been previously described for Fig. 1. Rheostat 33 is, however, in its approximate mid-position with switches 41 and 42 both open and the amount of resistance normally in the coil circuit of voltage regulating relay 28 is the same as that present in the all-in position of the rheostat in Fig. 1.

However, when source 11 becomes overloaded and overcurrent relay 10 closes its contacts 12, the position of the contacts of var relay 47 determines whether rheostat 33 will move in the direction to decrease or increase resistance in series with the coil of voltage regulating relay 28. If the output of source 11 is predominately reactive as was previously assumed and described in connection with Fig. 1, motor 36 of rheostat 33 is moved in the direction to decrease the resistance through the contacts 12 of relay 10, contacts 45 of relay 47 and limit switch 39 of rheostat 33. Voltage regulating relay 28 thus has its setting lowered and it controls the motor 20 of tap changer 37 to decrease the voltage of incoming bus 1 as before. When the output of source 11 decreases to the point where contacts 13 of relay 10 reclose, the rheostat 33 is moved towards its mid-position by motor 36 through contacts 13 of relay 10, the contacts of position switch 42 and limit switch 40 of rheostat 33. Contacts 30 of relay 28 control the motor 20 of tap changer 37 to increase the voltage of incoming bus 1 as before.

If the output of source 11 is predominately capacitive and exceeds the setting of relay 10, motor 36 of rheostat 33 is then moved in the direction to increase its resistance through the contacts 12 of relay 10, contact 46 of relay 47, and the limit switch 40 of rheostat 33. Voltage regulating relay 28 thus has its setting raised and through contacts 30 it controls motor 20 of tap changer 37 to increase the voltage of the winding of transformer 2 connected to incoming bus 1 and to decrease the voltage of the winding of transformer 2 connected to load bus 4. By thus attempting to decrease the voltage of load bus 4 with respect to incoming bus 1, additional capacitive volt amperes are supplied from the incoming bus 1 through transformer 2 to load bus 4 and to load 19, thus relieving source 11 of some of the capacitive volt ampere output it has been supplying to load 19. When the output of source 11 decreases to a point where the contacts 13 of relay 10 reclose, then rheostat 33 is moved toward its mid-position by motor 36 through the contacts 13 of relay 10, contacts of position switch 41, and limit switch 39 of rheostat 33. Contacts 29 of relay 28 control the motor 20 of tap changer 37 to again decrease the voltage of incoming bus 1 so that eventually relay 28 will again maintain a predetermined value of voltage on incoming bus 1.

Rheostat 33 is positioned in the approximate mid-position through the contacts 13 of relay 10 when these remain closed and through the respective contacts of position switches 42 or 41, either when source 11 is in operation or is shut down.

This regulating scheme shown in Fig. 2 will thus maintain the voltage of load bus 4 at a predetermined value when source 11 is in operation and will hold the output of source 11 within its full rated capacity irrespective of whether its output is predominately reactive or capacitive. When source 11 is shut down, voltage regulating relay is transferred, as was done in Fig. 1, to hold the voltage of load bus 4, instead of incoming bus 1, in exactly the same manner as previously described for Fig. 1.

If source 11 is a synchronous condenser, as is here shown, commercial designs of these machines are usually such that they are unable to put out a sufficient amount of capacitive volt amperes to overload them. Hence, overload relay 10, if the output of source 11 is in capacitive volt amperes, will usually not be able to open its contacts 13 or close its contacts 12. Hence, it will be necessary to provide a lower calibration for relay 10 when the condenser is delivering its limit of output in capacitive volt amperes or to provide some other means of detecting this condition.

Fig. 3 shows how the recalibration of overload relay 10 can be accomplished. Relay 10 is provided with recalibrating coil 49 which when energized through contacts 48 of relay 47, closed when source 11 is underexcited and is supplying capacitive volt amperes, reduces the overcurrent setting of relay 10 the desired amount. Adjustable resistance 50 provides the required adjustment for the purpose. The contacts of relay 10 and of relay 47 cooperate to control the position of motor operated rheostat 33 as previously described for Fig. 2—the difference is merely that relay 10 operates in response to a lower value of capacitive volt ampere output of source 11.

It is also possible instead of providing a recalibrating means for relay 10 to provide an additional relay 56 as shown in Fig. 4 similar to relay 10 but with a lower calibration to control the position of rheostat 33 when the condenser is operating underexcited and delivering capacitive volt amperes to the system. Contacts 57 of relay 56 through contacts 46 of relay 47 cause motor 36 to rheostat 33 to increase its resistance on an excess output of capacitive amperes of source 11 due to underexcitation, and contacts 12 of relay 56 through contacts 45 of relay 47 cause motor 36 of rheostat 33 to decrease its resistance on excess output of reactive volt amperes due to overexcitation. Motor 36 of rheostat 33 runs rheostat 33 to the mid-position as determined by position switch 41 or 42 if source 11 is supplying capacitive volt amperes not in excess of the setting of relay 56, through contacts 58 of relay 57 and contacts 13 of relay 10, in series. If source 11 is supplying reactive volt amperes below the setting of relay 10, then motor 36 of rheostat 33 runs rheostat 33 to the mid-position as determined by position switch 41 or 42, through contacts 13 of relay 10 and contacts 59 of relay 47, which are closed when source 11 is operating overexcited and supplying reactive volt amperes, in series.

Another method of detecting that source 11 has reached its maximum output on underexcitation is to provide an undercurrent relay 53 with coil 55 in the field circuit 9 of source 11 as shown in Fig. 5. The use of such a relay, whose contacts 52 will close at practically zero field current and whose contacts 51 will close at a slightly higher value of field current will take the place of the reactive relay 47 in Figs. 2, 3 and 4 and the reduced setting of relay 10 obtained by the use of the recalibrating coil 49 on relay 10 in Fig. 3 and relay 56 in Fig. 4. Polarizing coil 54 is provided on relay 53 in a manner well known in the art so that contacts 51 and 52 can be made to operate at low current values through coil 55.

When contacts 52 of relay 53 close indicating that source 11 is supplying the desired maximum capacitive volt amperes to the load or system, motor 36 of rheostat 33 is operated to increase the resistance of rheostat 33. When contacts 12 of overcurrent relay 10 close, motor 36 of rheostat 33 is operated to decrease the resistance of rheostat 33. When contacts 51 of relay 53 and contacts 13 of relay 10 are closed, the motor 36 of rheostat 33 will run rheostat 33 to the mid-position through the contacts of rheostat position switch 41 or 42, whichever is closed. The results of the aforesaid operations of rheostat 33 on the calibrating of relay 28 on the voltage held on the incoming bus 1 have been previously described in connection with the scheme of operation for Fig. 2.

It is possible in the schemes shown in Figs. 2, 3, 4 and 5 to provide two identical rheostats of the type shown in Fig. 1 instead of a single rheostat with double the resistance and mid-position switches 41 and 42. The control circuits of a scheme with these two rheostats would be arranged so that one of the rheostats, normally in the position with the resistance all in, would be controlled to decrease its resistance when the condenser 11 has reached its rated output in reactive volt amperes as already described for Fig. 1; and the other rheostat, normally in the resistance all-out position, would increase its resistance when the condenser has reached its maximum output of capacitive volt amperes. The use of the single rheostat 33 with mid-position switches is merely a more economical and practical arrangement.

It is even possible to omit rheostat 33 entirely in all of these schemes by placing the contacts of relays 10 in Fig. 1, of relays 10 and 47 in Figs. 2 and 3, and of relays 56, 10 and 47 in Fig. 4 and of relays 10 and 53 in Fig. 5 directly in the control circuits of motor 20 of tap changer 31 in cooperation with the contacts 29 and 30 of volt regulating relay 28 in a manner well known in the art. The use of rheostat 33, however, has the advantage that it provides greater segregation and simplicity of control which is desirable for this type of installation.

What I claim as new and desire to secure by Letters Patent of the United States is:

1. A voltage regulating arrangement comprising a variable ratio power transformer for interconnecting an alternating current power supply circuit with a load circuit, a separate source of volt amperes for supplying the load circuit, an electroresponsive device responsive to the output of said source, and means controlled by said device for varying the ratio of said transformer to control the voltage of the supply circuit.

2. A voltage regulating arrangement comprising a variable ratio power transformer for interconnecting an alternating current power supply circuit with a load circuit, a separate source of volt amperes for supplying the load circuit, an electroresponsive device responsive to the output of said source, means controlled by said device for varying the ratio of said transformer to control the voltage of the supply circuit, and means effective when said source is inactive for varying the ratio of said transformer to control the voltage of the load circuit.

3. A dual voltage regulating arrangement comprising a variable ratio power transformer for interconnecting an alternating current power supply circuit with a load circuit, means including a variably excited condenser for separately regulating the voltage of the load circuit, an electroresponsive device responsive to the var output of said condenser, and means controlled by said device for selectively varying the ratio of said transformer and the excitation of said condenser to control the voltages of said circuits under varying load conditions.

4. A voltage regulating arrangement comprising a variable ratio power transformer for interconnecting an alternating current power supply circuit with a load circuit, means including a variably excited condenser for separately regulating the voltage of the load circuit, an electroresponsive device responsive to the excitation of said condenser, and means controlled by said device for varying the ratio of said transformer to control the voltage of the supply circuit.

5. A dual voltage regulating arrangement for use in an alternating current system comprising means including a variable voltage ratio alternating current power transfer device for supplying a variable load from the system, voltage regulating means including a variable output source of volt amperes connected to the load circuit of the device to maintain the load voltage substantially constant, and an electroresponsive regulating device responsive to the voltage of the supply circuit of the device and having means controlled thereby for varying the voltage ratio of the transfer device to control the voltage of the supply circuit.

6. A voltage regulating arrangement for an alternating current power supply line comprising a variable voltage ratio alternating current power transformer for supplying a variable load from the line, voltage regulating means connected to be responsive to the load voltage of said transformer and having a synchronous condenser connected to be controlled thereby for maintaining said load voltage substantially constant, and a voltage responsive device connected to be responsive to the line voltage of said transformer and having means controlled thereby for varying the voltage ratio of said transformer to control the line voltage.

7. A voltage regulating arrangement for use in an alternating current power system having an incoming power bus and a load bus comprising means including a tap transformer for interconnecting said buses, a synchronous condenser for connection to the load bus and having automatic excitation regulating means for maintaining the load bus voltage substantially constant, and regulating means including a relay for responding to variation of the voltage of the incoming power but from a predetermined value and tap changing mechanism operable under the control of said relay for varying the voltage ratio of said transformer to return said incoming bus voltage substantially to said value.

8. A voltage regulating arrangement for an alternating current power supply line comprising a variable voltage ratio alternating current power transfer device for supplying a variable load from the line, a voltage responsive device connected to be responsive to the load voltage of the device and having a variable output source of volt amperes controlled thereby for maintaining the load voltage substantially constant, an adjustable voltage responsive device connected to be responsive to the line voltage of the transfer device and having means controlled thereby for varying the voltage ratio of said device to control the line voltage and electroresponsive means responsive to variations in the output of said source for adjusting said voltage responsive device.

9. A voltage ratio regulating arrangement for use in an alternating current power system comprising means including a variable voltage ratio transformer for supplying a variable load from the system, voltage regulating means including a variable output synchronous condenser connected to the load circuit of said transformer to maintain the load voltage substantially constant, an adjustable voltage regulating device responsive to opposite variations of the voltage of the supply circuit of said transformer and having means controlled thereby for correspondingly varying the voltage ratio of said transformer, and electroresponsive means responsive to opposite variations of the output of said condenser for correspondingly adjusting said voltage regulating device.

10. A voltage regulating arrangement for an alternating current supply line comprising a variable voltage ratio alternating current power transfer device for supplying a variable load from the line, voltage regulating means including a variable output source of volt amperes normally connected to the load circuit of the device to maintain the load voltage substantially constant, and a voltage responsive device normally connected to be responsive to variation of the line voltage of the transfer device and having operating means controlled thereby for varying the voltage ratio of the transfer device to regulate the line voltage thereof, and means including an automatic transfer relay for connecting said voltage responsive device to be responsive to the voltage of the load circuit of said transfer device and reversing the control of said operating means to regulate the load circuit voltage when said source is disconnected.

11. A voltage regulating arrangement for use in an alternating current power system having an incoming power bus and a load bus comprising a variable voltage ratio transformer for interconnecting the buses, voltage responsive reversible control means for varying the voltage ratio of the transformer, a variable output synchronous condenser normally connected to the load bus and having excitation regulating means for maintaining the load bus voltage substantially constant, and means including an automatic transfer relay for connecting the voltage responsive control means to be responsive to variation of the incoming bus voltage when said synchronous condenser is connected to the load bus and to be reversely responsive to variation of the load bus voltage when the synchronous condenser is disconnected.

12. A voltage regulating arrangement for use in an alternating current power system comprising means including a voltage ratio regulating transformer for supplying a variable load from the system, voltage regulating means including a variable output synchronous condenser adapted to be connected to the load circuit of said transformer to maintain the load voltage substantially constant, ratio control means for said transformer including a voltage responsive device normally responsive to variation of the supply voltage of the supply circuit of said transformer from a predetermined value, and electroresponsive means responsive to the var output of said synchronous condenser for varying the response of said device.

HERMAN BANY.

No references cited.